(12) United States Patent
Saliger et al.

(10) Patent No.: US 10,981,473 B2
(45) Date of Patent: Apr. 20, 2021

(54) VEHICLE SEAT FOR A MOTOR VEHICLE

(71) Applicant: Ford Global Technologies, LLC, Dearborn, MI (US)

(72) Inventors: Michael Saliger, Bedburg (DE); Klaus Schuermanns, Cologne (DE); Jill Catherine Huptas, Rommerskirchen (DE); Jens Oberschelp, Cologne (DE); David Lostrek, Cologne (DE); Clemens Fock, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 16/266,370

(22) Filed: Feb. 4, 2019

(65) Prior Publication Data
US 2019/0241100 A1 Aug. 8, 2019

(30) Foreign Application Priority Data
Feb. 7, 2018 (DE) .......................... 102018201895.2

(51) Int. Cl.
| | | |
|---|---|---|
| *B60N 2/56* | (2006.01) | |
| *B60N 2/005* | (2006.01) | |
| *B60N 2/02* | (2006.01) | |
| *G05D 1/02* | (2020.01) | |

(52) U.S. Cl.
CPC .......... *B60N 2/5621* (2013.01); *B60N 2/005* (2013.01); *B60N 2/0244* (2013.01); *B60N 2/5678* (2013.01); *G05D 1/021* (2013.01)

(58) Field of Classification Search
CPC ...... B60N 2/56; B60N 2/5621; B60N 2/5635; B60N 2/5642; B60N 2/5657; B60N 2/5678; B60N 2/5685

USPC .......................................................... 454/120
See application file for complete search history.

(56) References Cited

U.S. PATENT DOCUMENTS

| | | | |
|---|---|---|---|
| 6,793,016 B2* | 9/2004 | Aoki .................. | B60H 1/00285 165/202 |
| 9,463,715 B1 | 10/2016 | Rawlinson et al. | |
| 2004/0262940 A1 | 12/2004 | Johnson | |
| 2009/0229785 A1* | 9/2009 | Kadle .................. | B60N 2/5628 165/42 |
| 2014/0034049 A1* | 2/2014 | Castiglione .............. | A62B 9/04 128/202.27 |
| 2014/0326708 A1* | 11/2014 | Barfuss ................ | B60N 2/5685 219/204 |
| 2016/0264021 A1* | 9/2016 | Gillett ................. | H04M 1/7253 |
| 2017/0028876 A1 | 2/2017 | Yamada | |
| 2017/0101032 A1* | 4/2017 | Sugioka ................... | B60Q 3/80 |

FOREIGN PATENT DOCUMENTS

| | | | |
|---|---|---|---|
| CN | 103818280 A | | 5/2014 |
| CN | 105730286 | * | 7/2016 |
| CN | 105730286 A | | 7/2016 |
| JP | 2013095166 A | | 5/2013 |
| KR | 20160116501 A | | 10/2016 |

* cited by examiner

*Primary Examiner* — Vivek K Shirsat
*Assistant Examiner* — Ko-Wei Lin
(74) *Attorney, Agent, or Firm* — David Coppiellie; Price Heneveld LLP

(57) ABSTRACT

A motor vehicle, in particular a self-driving motor vehicle, has at least one vehicle seat, wherein the vehicle seat is constructed to be arranged at a selected position from a plurality of positions in the passenger compartment of the motor vehicle.

19 Claims, 2 Drawing Sheets

VEHICLE SEAT FOR A MOTOR VEHICLE

FIELD OF THE INVENTION

The present invention generally relates to vehicle seating for a motor vehicle, and more particularly relates for a vehicle such as a self-driving motor vehicle having a vehicle seat that is selectively positionable.

BACKGROUND OF THE INVENTION

The term "self-driving motor vehicle" (sometimes also an autonomous land vehicle) is commonly used to refer to passenger vehicles or other motor vehicles which can travel, park and control without the influence of a human driver (highly automated or autonomous driving). In the event that no manual control at all is required from the driver, the term robot car is also used. The driver seat can then remain empty and a steering wheel, brake pedal and accelerator pedal may not be present. The term "self-driving motor vehicle" further also includes trucks, agricultural tractors and military vehicles without the influence of the driver or completely without any driver.

The term "car seat" is used to refer to the vehicle seats which are installed in motor vehicles in the passenger compartment for the occupants. Depending on the type of vehicle used and the differentiation in accordance with driver and passenger seats, and in accordance with the equipment level, the vehicle seats which are installed in motor vehicles may in principle differ greatly from each other.

Most passenger vehicle models are provided at the front with a pair of adjacent individual seats. A driver seat is generally located at the side facing the oncoming traffic, and the steering and control instruments are located facing it. For the driver seat, partially also for the adjacent front seat, additional seat heating, seat air-conditioning and ventilation may be provided. In top-of-the-range vehicles, screens may be provided in the backwardly facing side of the backrests of the front seats in order to enable passengers in the rear seats to watch television, videos, etc. More comfortably equipped models typically have armrests.

As a result of the transition to highly automated or autonomous driving, however, the conventional interior space design for passengers is increasingly perceived to be limiting. In particular, the driver can assume alternative seat positions. It would be desirable to find ways in which assistance can be provided in this regard.

SUMMARY OF THE INVENTION

According to one aspect of the present invention, a motor vehicle is provided. The motor vehicle includes a vehicle seat constructed to be arranged at a selected position from a plurality of positions in the passenger compartment of the motor vehicle, and motor vehicle components at the plurality of positions, wherein the vehicle seat has a connection device for connecting vehicle seat components to the motor vehicle components at the selected position According to another aspect of the present invention, a self-driving motor vehicle is provided. The self-driving motor vehicle includes a vehicle seat constructed to be arranged at a selected position from a plurality of positions in the passenger compartment of the motor vehicle, and motor vehicle components at the plurality of positions, wherein the vehicle seat has a connection device for connecting vehicle seat components to the motor vehicle components at the selected position, and wherein the vehicle seat component is a seat ventilation and the motor vehicle component is an air supply device having at least one air outlet opening at each of the plurality of positions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1:
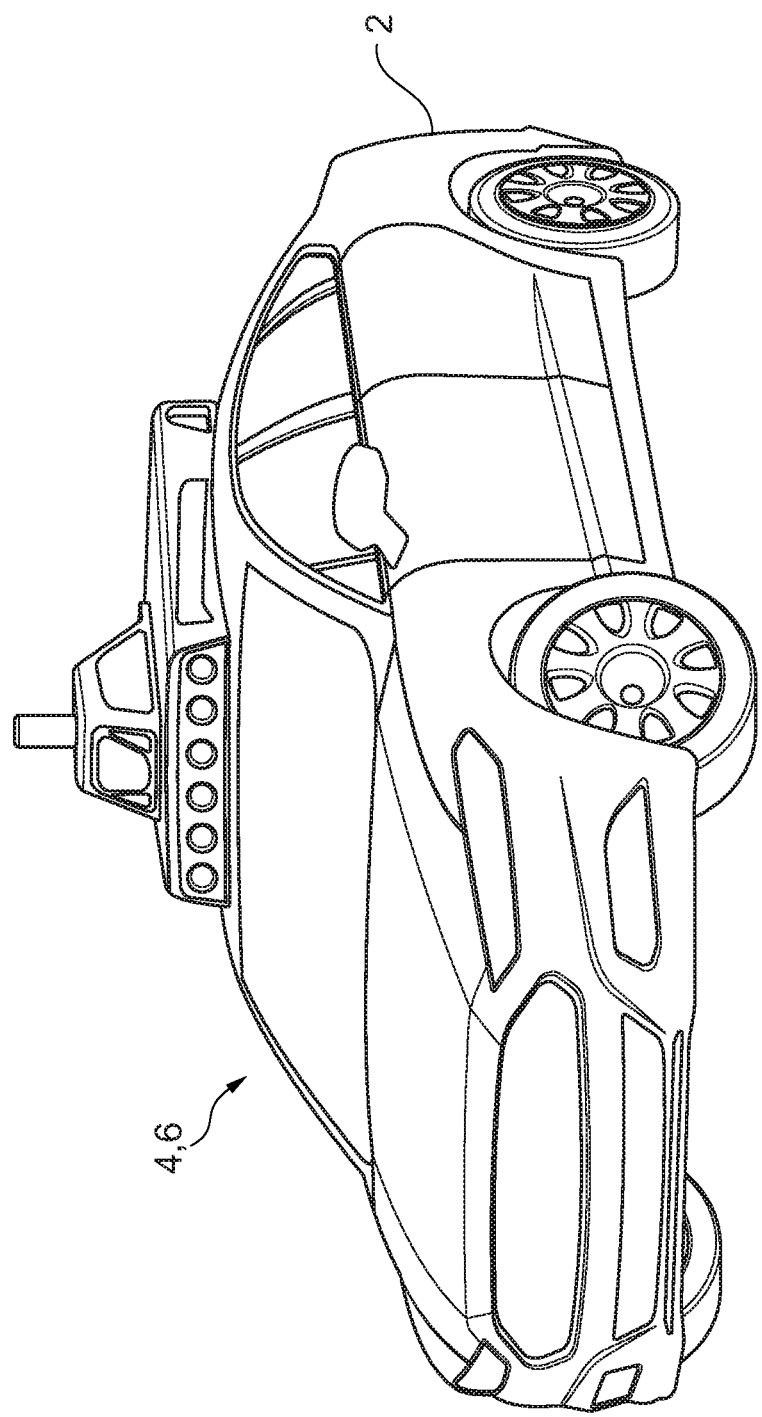
FIG. 1 is a perspective view of a motor vehicle equipped for self-driving, according to one embodiment.

Referring now to FIG. 1, there is illustrated a motor vehicle 2 which in the present embodiment is a passenger vehicle configured as a car generally equipped with one or more seats for seating one or more passengers. In contrast to the present embodiment, the motor vehicle may also be a truck or bus. Further, the motor vehicle 2 in the present embodiment is constructed as a self-driving motor vehicle for highly automated or autonomous driving. That is to say, the motor vehicle 2 can also be referred to as a robot car which complies with at least level 3 (high level of automation) of the classification of autonomous driving.

Figure 2:
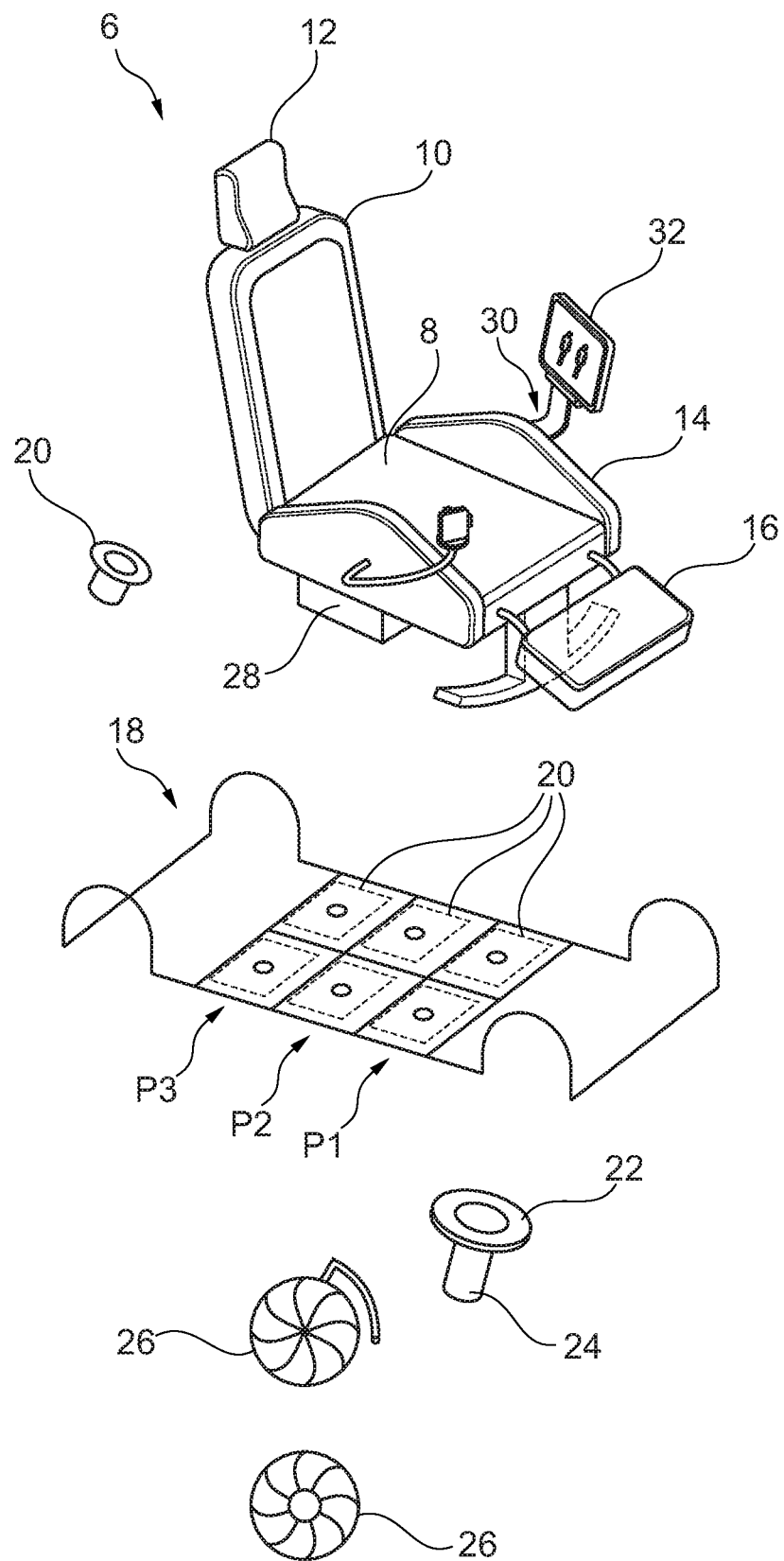
FIG. 2 is an exploded perspective view of a vehicle seat which can be placed in the inner space of the motor vehicle shown in FIG. 1.

The motor vehicle 2 has an inner passenger compartment 4 in which at least one vehicle seat 6 shown in FIG. 2 is arranged. The one or more vehicle seats 6 may seat one or more passengers in the passenger compartment 4.

The vehicle seat 6 will now be explained with additional reference to FIG. 2. The vehicle seat 6 has in the present embodiment a seat face 8, a backrest 10, a headrest 12 and seat side walls 14 and a foot rest 16. The position of the seat face 8, the backrest 10, the headrest 12, the seat side walls 14 and the footrest 16 can in the present embodiment be changed electrically via powered control devices. Furthermore, the vehicle seat 6 has a seat heating unit, seat air-conditioning and ventilation, as will be described below in detail.

Furthermore, the vehicle seat 6 may be arranged at a selected position P1, P2, P3 from a plurality of positions P1, P2, P3 in the passenger compartment 4 of the motor vehicle 2. To this end, there is provided on the vehicle side in the base region of the inner passenger compartment 4 at different positions P1, P2, P3 as a motor vehicle component an air supply device 18 having at least one air outlet opening 20. In this instance, the air supply device 18 is arranged in an underfloor region of the motor vehicle 2.

To each of the air outlet openings 20, an inlet nozzle 22 of a seat ventilation can be connected as a vehicle seat component of the vehicle seat 6 in order to supply the seat ventilation with air. To this end, the vehicle seat 6 is arranged at a selected position P1, P2, P3 of the plurality of positions P1, P2, P3 which are defined by the respective positions P1, P2, P3 of the respective air outlet opening 20.

In order to securely connect the air outlet opening 20 to the inlet nozzle 22, in the present embodiment the inlet nozzle 22 has a bayonet closure 24 with a longitudinal slot, while the air outlet opening 20 has studs which engage in the longitudinal slot.

As a result of the arrangement of the vehicle seat 6 at a selected position P1, P2, P3, one of the air outlet openings 20 is connected to the inlet nozzle 22. The remaining free air outlet openings 20 each have in contrast a closure device 26 for closing the respective air outlet openings 20. The closure devices 26 may be self-closing, that is to say, by producing a connection to the inlet nozzle 22, the respective closure device 26 is opened.

In the present embodiment, the closure device 26 is constructed as an iris diaphragm. In this instance, an iris diaphragm is understood to be a diaphragm with variable opening extent whose opening with a fixed center point can be changed in such a manner that it remains substantially circular.

Furthermore, the vehicle seat 6 has in the present embodiment a heating element 28 which may be an electric heating element, such as, for example, a PTC element. The heating element 28 may, for example, be constructed for directly heating the seat face 8 and/or the backrest 10. Additionally or alternatively, the heating element 28 may also be provided to heat air for the seat ventilation which flows through the outlet opening 20 and the inlet nozzle 22 into the vehicle seat 6.

Furthermore, the vehicle seat 6 has in the present embodiment an interface 30 for connecting an HMI 32 (human-machine-interface). It is thus possible to connect to the vehicle seat 6, for example, handheld devices, such as, for example, tablets, such that entertainment and/or infotainment components of the motor vehicle 2 can be controlled. Additionally or alternatively, via the HMI 32 a command panel and/or joystick can also be connected by use of which the motor vehicle 2 can be controlled, if necessary.

In the present embodiment, the plurality of positions P1, P2, P3 comprises a front position P1, a central position P2 and a rear position P3. The vehicle seat 6 is in the present embodiment constructed in such a manner that the vehicle seat 6, when it is arranged at the central position P2, provides a full sleep functionality. That is to say, the components of the vehicle seat 6, such as the seat face 8 and the backrest 10, may be moved into a position in which the vehicle seat 6 provides a flat reclining surface, in the manner of a bed. In this position, the vehicle seat 6 has its maximum extent in the direction of the longitudinal vehicle axis of the motor vehicle 2.

Finally, the vehicle seat 4 has in the present embodiment a seat console which is constructed so as to be able to be adjusted for driving dynamics compensation. The seat console has actuators such that the horizontal inclination of the vehicle seat 6 can be changed in four directions (left upward/downward, right upward/downward, front upward/downward, rear upward/downward). In this embodiment, a control device (not illustrated) controls the actuators, for example, in accordance with a bend radius and the actual speed of the motor vehicle 2 in order to at least partially compensate for forces acting on the driver or other passengers.

Furthermore, the control device may be constructed to adapt the association of the actuators to the movement axes of the respective seat position. For example, the vehicle seat 6 may be constructed to be able to be moved into a so-called panorama position in which, for example, the left front seat is rotated to the left through 90°.

Consequently, the vehicle seat 6 enables a driver, but also other passengers, to assume different alternative seat positions. Alternative seat positions are achievable with a motor vehicle, in particular a self-driving motor vehicle, having at least one vehicle seat, wherein the vehicle seat is constructed to be arranged at a selected position from a plurality of positions in the passenger compartment of the motor vehicle.

Consequently, it is possible to arrange the vehicle seat at alternative positions in the passenger compartment, while known vehicle seats are constructed to be able to be adjusted only from a single position. It is therefore possible in a surprisingly simple manner for a driver or other passengers to be able to select alternative seat positions.

According to an embodiment, the vehicle seat has a connection device for connecting vehicle seat components to motor vehicle components at the selected position. The vehicle seat can thus readily be connected at the selected position to motor vehicle components, such as, for example, an on-board network of the motor vehicle, in order to provide electrical operating energy for operating vehicle seat components.

According to another embodiment, the vehicle seat component is a seat ventilation and the motor vehicle component is an air supply device having at least one air outlet opening at each of the plurality of positions. The seat ventilation can thus be supplied with air whose guiding system is at least partially arranged in an underfloor region of the motor vehicle.

According to another embodiment, a closure device for closing the respective air outlet opening is associated with each air outlet opening. Unused air outlet openings, that is to say, air outlet openings which are not connected to an inlet nozzle of the seat ventilation, can thus be closed.

According to another embodiment, the seat ventilation has a bayonet closure for connecting to one of the air outlet openings. A tool-free connection of the air outlet opening to the inlet nozzle is thus possible.

According to another embodiment, the vehicle seat has a heating element. It is thus possible, for example, for a portion of the vehicle seat to be directly heated, or air is heated for the seat ventilation, wherein, as a result of the association of the heating element with the vehicle seat, it is not necessary for heated air to have to be conveyed through a long guiding system of the motor vehicle and to lose thermal energy again.

According to another embodiment, the vehicle seat has an interface for connecting an HMI. It is thus possible to connect to the vehicle seat handheld devices, such as, for example, tablets, such that entertainment and/or infotainment components of the motor vehicle can be controlled. Additionally or alternatively, it is also possible to connect via the HMI a command panel and/or joystick by use of which the motor vehicle can be controlled if necessary.

According to another embodiment, the vehicle seat can be arranged with the maximum extent thereof at least at one position of the plurality of positions. The vehicle seat provides a full sleep functionality, that is to say, the components of the vehicle seat, such as the seat face and the backrest, can be moved into a position in which the vehicle seat provides a flat reclining surface like a bed. In this position, the vehicle seat has its maximum extent in the direction of the longitudinal vehicle axis of the motor vehicle.

According to another embodiment, the vehicle seat is constructed to be adjustable for driving dynamics compensation. For example, the vehicle seat may have actuators such that the horizontal inclination of the vehicle seat can be changed in four directions (left upward/downward, right upward/downward, front upward/downward, rear upward/downward). A control device controls the actuators, for example, in accordance with a bend radius and the actual speed of the motor vehicle in order to at least partially compensate for forces acting on the driver or other passengers.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle comprising:
   a vehicle seat constructed to be arranged at a selected position from a plurality of positions in the passenger compartment of the motor vehicle;
   at least one vehicle seat component connected to the vehicle seat, wherein the at least one vehicle seat component is at least one seat ventilator; and
   a plurality of motor vehicle components at the plurality of positions, wherein the plurality of motor vehicle components is comprised of an air supply device having an at least one air outlet opening at each of the plurality of positions, and wherein each air outlet opening is removably coupled to the at least one vehicle seat component.

2. The motor vehicle as claimed in claim 1 further comprising a closure device associated with each air outlet opening for closing the respective air outlet opening.

3. The motor vehicle as claimed in claim 1, wherein the seat at least one seat ventilator has a bayonet closure for connecting to the at least one air outlet opening.

4. The motor vehicle as claimed in claim 1, wherein the vehicle seat has a heating element.

5. The motor vehicle as claimed in claim 1, wherein the vehicle seat has an interface for connecting a human machine interface.

6. The motor vehicle as claimed in claim 1, wherein the vehicle seat is configured to be arranged with a maximum extent thereof at least at one position of the plurality of positions.

7. The motor vehicle as claimed in claim 1, wherein the vehicle seat is constructed to be adjustable for driving dynamics compensation.

8. The motor vehicle as claimed in claim 1, wherein the motor vehicle is a self-driving motor vehicle.

9. The motor vehicle as claimed in claim 1, wherein the vehicle seat further comprises movement actuators, and wherein the movement actuators are configured to laterally rotate the vehicle seat.

10. The vehicle seat as claimed in claim 1, wherein the plurality of positions further define a front position, a central position, and a rearward position, and wherein the vehicle seat is configured to be a flat surface in the central position.

11. A self-driving motor vehicle comprising:
    a vehicle seat constructed to be arranged at a selected position from a plurality of positions in the passenger compartment of the motor vehicle, wherein the vehicle seat further comprises movement actuators, and wherein the movement actuators are configured to laterally rotate the vehicle seat;
    at least one vehicle seat component connected to the vehicle seat, wherein the at least one vehicle seat component is at least one seat ventilator; and
    a plurality of motor vehicle components at the plurality of positions, wherein the at least one vehicle seat component is configured to removably couple to the plurality of motor vehicle components at the plurality of positions, and wherein the plurality of motor vehicle components including an air supply device having at least one air outlet opening at each of the plurality of positions.

12. A motor vehicle comprising:
    a vehicle seat constructed to be arranged at a selected position from a plurality of positions in the passenger compartment of the motor vehicle, wherein the plurality of positions further define a front position, a central position, and a rearward position, and wherein the vehicle seat is configured to be a flat surface in the central portion;
    at least one vehicle seat component connected to the vehicle seat, wherein the at least one vehicle seat component is at least one seat ventilator; and
    a plurality of motor vehicle components at the plurality of positions, wherein the plurality of motor vehicle components is comprised of an air supply device having at least one air outlet opening at each of the plurality of positions, and wherein each air outlet opening is removably coupled to the at least one vehicle seat component.

13. The vehicle seat as claimed in claim 12, wherein there is at least one closure device for closing the at least one air outlet opening.

14. The vehicle seat as claimed in claim 12, wherein the at least one seat ventilator has a bayonet closure for connecting to one of the at least one air outlet opening.

15. The vehicle seat as claimed in claim 12, wherein the vehicle seat has a heating element.

16. The vehicle seat as claimed in claim 12, wherein the vehicle seat has an interface for connecting a human machine interface.

17. The vehicle seat as claimed in claim 12, wherein the vehicle seat is configured to be arranged with a maximum extent thereof at least at one position of the plurality of positions.

18. The vehicle seat as claimed in claim 12, wherein the vehicle seat is constructed to be adjustable for driving dynamics compensation.

19. The vehicle seat as claimed in claim 12, wherein the motor vehicle is a self-driving motor vehicle.

* * * * *